I. BUCKMAN.
Breech-Loading Fire-Arm.
No. 527. Reissued Feb. 16, 1858.
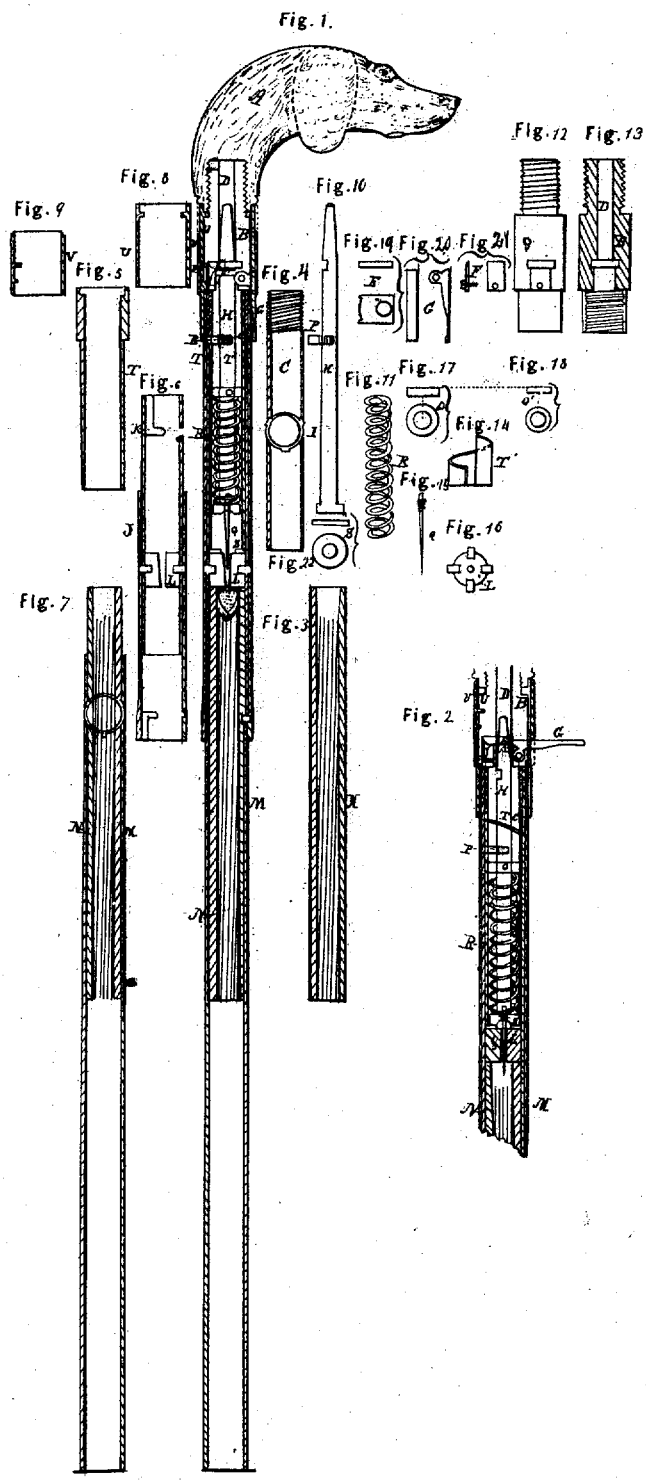
N. PETERS, PHOTO-LITHOGRAPHER, WASHINGTON, D.C.

UNITED STATES PATENT OFFICE.

IRA BUCKMAN, JR., OF NEW YORK, N. Y.

WALKING-STICK GUN.

Specification forming part of Letters Patent No. 17,915, dated August 4, 1857; Reissue No. 527, dated February 16, 1858.

*To all whom it may concern:*

Be it known that I, IRA BUCKMAN, Jr., of the city, county, and State of New York, have invented certain new and useful Improvements in Fire-Arms, which I apply more particularly to a gun or sporting cane; and I do hereby declare that the following is a full and exact description of the same, reference being had to the accompanying drawings, and to the letters of reference marked thereon.

The nature of my invention consists of arranging and operating the lock of the gun so that no portion of it is exposed when the implement is used as a cane, and so that there is no opportunity of accidentally discharging the gun; also, to the construction and arrangement of the barrel to allow of its being loaded with facility, and to insure to it the requisite degree of strength in view of its being kept as light as possible for the purpose of being used as a cane.

Figure 1 in the accompanying drawings is a longitudinal and vertical section through the center of the gun, showing the barrel loaded and the lock "cocked." Fig. 2 is a similar view of the lock-case and rear part of the barrel detached, showing the lock after the gun has been fired off. Fig. 3 is a similar view of the barrel detached. Figs. 4, 5, 6, 8, and 9 are similar views of portions of the lock-case detached. Fig. 7 is a similar view of the body of the cane detached. Fig. 10 is a similar view of the lock-piston detached, and Fig. 11 of the spring which gives the lock-piston its backward movement. Fig. 12 is a plan, and Fig. 13 a sectional, view of the rear end of the lock-case. Fig. 14 is a detached plan view of the spiral cam which sets or gives the lock-piston its forward movement. Fig. 15 is a view of the firing-needle detached. Fig. 16 is an end view of the breech-pin detached. Figs. 17 and 18 are plan and end views of the guides for the lock-piston, detached. Figs. 19 20, and 21 are severally plan and end views of the lock-catch, trigger, and spring; and Fig. 22 is a similar view of the packing against which the lock-piston operates.

A is the head or handle of the cane, forming also the stock of the gun, by which the gun is held in the act of firing.

B is the rear end of the lock-case, to the back end of which is secured, by being screwed on the handle A and to its front end, the body of the lock-case C. Through the center of this section is made an aperture, D, in which the tail end of the lock-piston operates. In a properly-fitting aperture, near its front end, the lock-catch E operates in a vertical direction, and upon its upper side is located the spring F, which acts upon the top of the lock-catch to keep it pressed downward to position, and upon its lower side is placed the trigger G, by which the lock is fired.

C is the body of the lock-case, in which the lock-piston H operates. It is screwed onto the front end of the section B, to secure it in position, and has the pins I equidistantly placed on its circumference about the middle of its length, by which the section J of the lock-case is fastened to it by the slotted aperture K. At about the center of the length of the last-named section the breech-pin L is securely fastened by being pinned to it by pins running through and into the breech-pin, as shown in Fig. 16. To its front end is secured, in a similar manner to its fastening to the body C, the body M of the cane, containing at its upper end the gun-barrel N, secured to it by being brazed or soldered. The body M is made of light sheet metal, and serves the double purpose of continuing the length of the cane without materially increasing its weight, and of guiding and directing the course of the bullet from the barrel in its true course before being exposed to the action of the external air. The barrel N forms a tight joint against the front end of the breech-pin L, to prevent a leakage of the gases produced by the firing of the powder, and consequently a loss of a portion of the useful effect of the powder, and is bored out and rifled to suit the size of the bullet to be used in it.

H is the lock-piston, working in the guides O O′, to keep it in position longitudinally, and having a pin, P, upon its upper side, working in a slot in the body of the lock-case C, to keep it from turning around. It has the needle Q inserted in its front end, which works through an aperture in the center of the breech-pin, and which enters and fires the percussion-powder placed in the cavity of the bullet. It also has a slot formed upon its upper side, near its rear end, in which the lock-catch E enters to hold it in place when cocked until the catch is released by the movement of the trigger, when it is thrust forward by the action of the coiled spring R. A thin piece of rubber or leather packing, S, in the form of an annular ring, is placed and held in position between the front end of the lock-case C and the rear end of the breech-pin L, to serve the double purpose of receiving the thrust of the lock-pin to prevent its rebound, and to prevent the escape of gas into the lock-case in the act of firing. It is "cocked" or moved backward to the position shown in Fig. 1 by the section T of the lock-case, through a spiral cam, T′, in the interior of the section, working against the pin P when that section is rotated by the hand of the operator. This section of the lock-case slips over the body of the lock-case, and is held in position longitudinally by the thimble U at its rear end and by the section J at its front end.

V is a thimble sliding on the surface of the sections B and U, which confines and holds fast the trigger G and the block-catch E, so that the trigger cannot be operated or the lock be fired without removing and sliding it back, as shown in Fig. 2.

W is the bullet, of conoidal form, having a charge of percussion-powder placed in the cavity formed in its rear end in a manner well known and in common use.

Its operation is as follows: The barrel being loaded, as shown in Fig. 1, the thimble V is moved back, this thimble having two pins on its interior surface, one of which restricts its forward movement, and the other moves over and upon the spring F, to hold the lock-catch E so that it cannot be moved from its position nor the trigger be operated until it is moved back and the section T is rotated, moving back the lock-piston, so that the catch E falls into the slot in the piston and holds it in position ready for firing. The trigger G is then moved back by the finger of the operator, releasing the catch E from the slot named, and allowing the piston to be thrust forward by the recoil of the spring R, and the needle in its front end to enter and fire the percussion-powder in the bullet W, as shown in Fig. 2. To load the gun the body M and barrel N are removed, and the loaded bullet is inserted in the rear end of the barrel. The lock is then cocked and the body and barrel are then replaced in position and the gun is ready to be fired, as before. It is preferable to cock the lock before the barrel, with the loaded bullet in, is replaced in position, to prevent the accidental discharge of the gun by the bullet being pierced by the needle Q.

The advantages claimed for my improvements are that the lock is composed of but few working parts, none of which are liable to get disordered by use, but which can readily be renewed and replaced if necessity requires; that the lock cannot be operated and the gun be discharged by accidental concussion or derangement of its parts; that no part of the lock is visible and exposed to the surface to interfere with the use of the implement as a cane except the trigger, and that is restrained and kept in position so that it cannot be operated accidentally, and that for the same reason the lock is not liable to be injured or damaged or hindered in its operation in damp or rainy weather; that by the construction and arrangement of the barrel the gun is capable of being fired as rapidly as a Sharp's rifle or fire-arm without being liable to be heated as that is, as the barrel is cooled by a current of air passing through it every time it is removed to be loaded, and that by the barrel being secured perfectly tight in all its connections no useful effect of the powder is lost in the act of firing.

Although my improvements are shown only as attached to a gun-cane, it is apparent that they can be attached to other descriptions of fire-arms with equal advantage, and particularly to pocket-pistols, to be carried in the belt or dress of a person, as they would occupy but little space, and would present no obstacle on the surface to their ready removal for use.

I do not claim combining a gun and cane together so that they can be used for either purpose; but What I do claim as my invention, and desire to secure by Letters Patent, is—

1. Moving the lock-piston H backward to effect the cocking of the lock by revolving the section T and its attached spiral cam T′, as described.

2. Cocking the lock (or retaining the lock-piston H in position when moved backward its full extent) by the locking-plate E dropping into a transverse groove in the top of the piston, as described.

3. The construction and operation of the trigger G, as described, which enables the trigger to be closed up against the body of the gun while the lock is cocked.

4. The combination of the locking-plate E with the trigger G, as described, by which the strain of the spring of the piston H is brought entirely upon the locking-plate, leaving the trigger free from strain or pressure and enabling the trigger to discharge the lock with slight effort.

5. The thimble V, as described, for the purpose of being moved over the lock-catch E and trigger G, to confine and secure them so that the lock cannot be operated without first moving back the thimble.

6. Extending the body M beyond the end of the barrel N, and constructing it of lighter material than the barrel, as described, for the purpose of making the cane of requisite length, and of guiding and directing the course of the bullet after it is fired from the barrel, without adding materially to the weight of the implement.

IRA BUCKMAN, JR.

Witnesses:
M. HASKELL,
FRANCIS S. LOW.